United States Patent
Osthelder et al.

(10) Patent No.: US 10,494,967 B1
(45) Date of Patent: Dec. 3, 2019

(54) SYSTEMS AND METHODS FOR DETERMINING OIL LEVEL IN A MARINE DRIVE

(71) Applicant: Brunswick Corporation, Mettawa, IL (US)

(72) Inventors: Robert R. Osthelder, Omro, WI (US); Matthew W. Snyder, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 104 days.

(21) Appl. No.: 15/888,869

(22) Filed: Feb. 5, 2018

(51) Int. Cl.
| | | |
|---|---|---|
| *F01M 11/12* | (2006.01) | |
| *G07C 5/00* | (2006.01) | |
| *B63H 20/00* | (2006.01) | |
| *F02B 61/04* | (2006.01) | |
| *F01M 11/00* | (2006.01) | |

(52) U.S. Cl.
CPC ............ *F01M 11/12* (2013.01); *B63H 20/002* (2013.01); *G07C 5/006* (2013.01); *B63B 2758/00* (2013.01); *B63B 2770/00* (2013.01); *F01M 11/0004* (2013.01); *F01M 2250/60* (2013.01); *F01M 2250/64* (2013.01); *F02B 61/045* (2013.01)

(58) Field of Classification Search
USPC .............................. 73/114.55, 114.56, 115.02
See application file for complete search history.

(56) References Cited

U.S. PATENT DOCUMENTS

| | | | | |
|---|---|---|---|---|
| 4,445,470 A | * | 5/1984 | Chmielewski | F01M 3/00 123/196 S |
| 4,920,936 A | * | 5/1990 | Slattery | F01M 11/00 123/196 S |
| 4,988,996 A | * | 1/1991 | Ito | B63J 99/00 340/984 |
| 5,236,380 A | * | 8/1993 | Schueller | B63H 20/002 440/75 |
| 5,937,801 A | * | 8/1999 | Davis | F01M 5/002 123/196 AB |
| 6,227,921 B1 | | 5/2001 | Feehan | |
| 6,401,682 B1 | * | 6/2002 | Nozue | F01M 1/02 123/195 P |
| 8,657,638 B1 | | 2/2014 | Gonring | |
| 9,193,429 B1 | * | 11/2015 | Langenfeld | F01M 11/12 |
| 2011/0144851 A1 | * | 6/2011 | Gremminger | G01N 27/221 701/31.4 |

* cited by examiner

*Primary Examiner* — Eric S. McCall
(74) *Attorney, Agent, or Firm* — Andrus Intellectual Property Law, LLP (57) ABSTRACT

A system for determining an oil amount in a marine drive includes an oil level sensor that senses an oil level in the sump and temperature sensor sensing an engine temperature. A control module for the system is configured to determine that the engine temperature is greater than a temperature threshold, and that an engine speed exceeds a speed threshold for at least a predetermined time period or that a throttle position exceeds a throttle position threshold. If both such conditions are met, and a threshold drop in engine speed to an idle threshold is detected or a threshold change in throttle position to an idle position is detected, then an oil level in the sump is sampled with an oil level sensor. An oil amount is then determined based on the sampled oil level in the sump.

20 Claims, 6 Drawing Sheets

SYSTEMS AND METHODS FOR DETERMINING OIL LEVEL IN A MARINE DRIVE

FIELD

The present disclosure relates to marine drive, and more specifically to sensing systems and methods for determining an amount of oil in a marine drive.

BACKGROUND

The following U.S. Patents and Applications provide background information and are incorporated herein by reference in entirety.

U.S. Pat. No. 6,227,921, which is incorporated herein by reference in its entirety, discloses a marine propulsion device, such as an outboard motor, provided with an oil measuring gage or dipstick which is accessible by the operator of the outboard motor without having to remove the cowl from the device. A first end of the dipstick extends through a dipstick tube into the oil sump of the outboard motor and a second end of the dipstick is connected to a handle that extends through the cowl. The handle is shaped to be retained in a hole formed through the cowl in such a way that the hole is sealed by a portion of the handle to prevent water from passing into the engine compartment through the cowl. A dampening mechanism is provided to dampen vibrations that would otherwise be transmitted between the handle and the dipstick.

U.S. Pat. No. 8,657,638, which is incorporated herein by reference in its entirety, discloses systems for determining oil level in outboard motors comprise an internal combustion engine, a control circuit that determines whether oil has drained into a sump from the internal combustion engine, and an oil sensor sensing the oil level in the sump. The control circuit can calculate a characteristic of the oil level based upon the sensed oil level after the oil has drained back into the sump and based upon a trim position of the outboard motor. In other examples, methods of determining oil level in a marine outboard motor include determining, with a control circuit, that oil has drained into a sump from an internal combustion engine in the outboard motor; sensing an oil level in the sump once the oil has drained back into the sump; and calculating, with the control circuit, a characteristic of the oil level of the outboard motor based upon the sensed oil level and a trim position of the outboard motor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a system for determining an oil amount in a marine drive includes an oil level sensor that senses an oil level in the sump and temperature sensor sensing an engine temperature. A control module for the system is configured to determine that the engine temperature is greater than a temperature threshold, and that an engine speed exceeds a speed threshold for at least a predetermined time period or that a throttle position exceeds a throttle position threshold. If such conditions are met, and a threshold drop in engine speed to an idle threshold is detected or a threshold change in throttle position to an idle position is detected, then an oil level in the sump is sampled with an oil level sensor. An oil amount is then determined based on the sampled oil level in the sump.

In one embodiment, a method of determining an amount of oil in marine drive during operation of the marine drive includes determining that an engine temperature exceeds a temperature threshold, and that an engine speed of an internal combustion engine is maintained above a speed threshold for at least a first predetermined time period or that a throttle position exceeds a throttle position threshold for at least a predetermined time period. If a threshold drop in engine speed to an idle threshold is detected or a threshold change in throttle position to an idle position is detected, then an oil level in the sump is sampled with an oil level sensor. An oil amount in the marine drive is then determined based on the sampled oil level in the sump.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
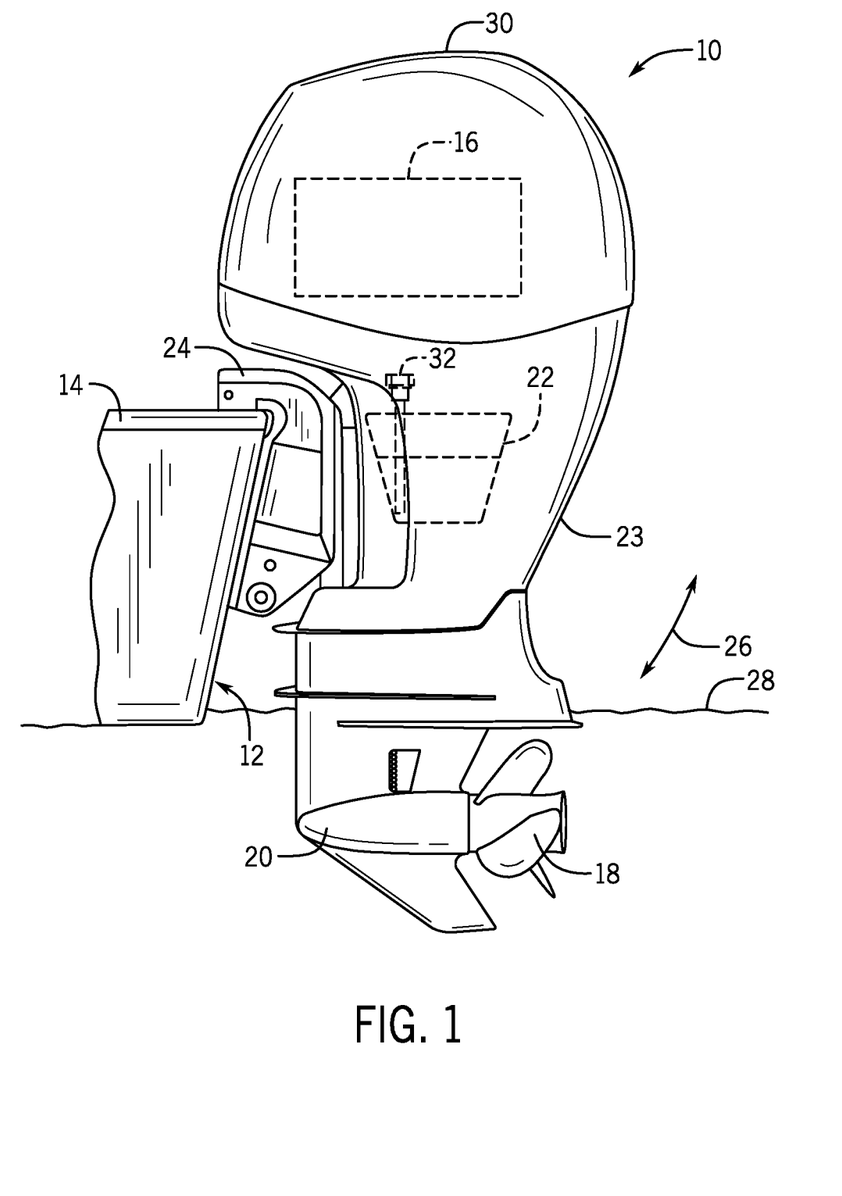
FIG. 1 depicts an exemplary marine drive, which is an outboard motor, on a marine vessel.

FIG. 1 depicts an exemplary marine drive 10, which is an outboard motor having a housing 30 and mounted on the stern 12 of a marine vessel 14. The type and configuration of the marine vessel and marine drive can vary from that which is shown. In other examples, the marine drive 10 may be an inboard motor, a stern drive, a jet drive, or any other type of propulsion device for propelling a marine vessel 14. The marine drive 10 includes an internal combustion engine 16 that causes rotation of a conventional propeller 18 extending from a propeller housing 20. A sump 22 is located in a drive shaft housing 23 beneath the internal combustion engine 16 and holds oil that is circulated to and from the internal combustion engine 16 for providing lubrication. The size, structure, and orientation of the sump 22 can vary from that which is shown.

In the depicted embodiment, the marine drive 10, being an outboard motor, is pivotably connected to the stern 12 of the marine vessel 14 by a connecting bracket 24, which facilitates trimming movement of the marine drive 10 along the direction shown by trim arrows 26 to thereby change the angle of the propeller 18 with respect to the waterline 28, as is conventional. Trimming of the marine drive 10 is employed during operation to adjust the angle of thrust on the marine vessel 14, and is also conventionally employed during maintenance, storage, and/or transportation of the marine vessel 14 over land.

Manufactures of marine drives typically recommend that the operator check the oil level in the sump 22 before each use of the marine drive 10, and maintain a proper amount of oil in the sump 22 to prevent damage to the internal combustion engine 16. In existing marine drives having oil sensors, oil level data is collected at key up, when the engine is cold and all of the oil is contained in the sump 22.

However, this measurement system only allows for one attempt at sampling oil level per key cycle. The inventors have recognized that such limited opportunities for measurement decreases the effectiveness of the oil level sensor system because several conditions can lead to a failure to measure oil level, and thus such marine drives may go for extended periods without an accurate oil level measurement. For example, if the marine drive is keyed up while it is at an angle, the oil sensor reading will not be accurate. Systems have been developed to account for trim position in oil level measured by electronic oil sensors; however, such account for trim only solves the problem in some circumstances and still leads to an inability to get an accurate oil level measurement at key up. For example, measurements taken when the marine drives are keyed on at angles not accounted for by the trim sensor will not be accurate. For instance, if a marine drive is keyed up on a boat ramp, the trim angle does not represent the engine angle in relation to vertical. Operators commonly key up the marine drive 10 as the boat is being put into the water from a boat ramp, and such conditions are likely to yield an unreliable oil level measurement. The inventors further recognize that instructions to key on the marine drive 10 only when the marine vessel is horizontal and the marine drive 10 is at a particular trim angle are unlikely to be heeded by operators, and inaccurate oil level sensing could result.

In view of the foregoing problems and challenges recognized by the inventors, they endeavored to develop a system that could reliably measure an amount of oil in the marine drive during normal operation thereof. Prior to the inventors' experimentation and research in the current endeavor, it was believed that oil level sensors could not be reliably operated while the marine drive 10 was running, especially during normal operation of the marine vessel on a water surface. Namely, the prevailing belief in the industry was that the electronic oil level measurement, e.g. the output of the oil level sensor 32, would be highly variable and inaccurate as oil sloshed around in the sump 22 due to movement of the marine vessel 14. However, upon extensive research and experimentation by the inventors, they recognized that oil level can be reliably measured under a certain defined set of conditions.

Resulting from extensive experimentation and research, the inventors developed the disclosed system and method that determines an amount of oil in the engine while the engine is running. Namely, after significant effort in gathering and analyzing recorded data from endurance engines, the inventors developed the disclosed strategy, which samples the engine oil level with the oil level sensor when the engine is brought back to idle from above an engine speed threshold. More specifically, the inventors have recognized that a consistent and reliable determination of oil amount can be conducted when an engine temperature is greater than a temperature threshold, the engine 16 has been running above a calibrated engine speed threshold for at least a predetermined time period, and the engine is then directly returned to an idle speed. After a specified delay upon returning to idle, an oil level in the sump can be reliably sampled and an oil amount in the marine drive 10 determined therefrom. This allows for improved monitoring of an oil amount in the marine drive, as it provides more opportunities for oil level sampling attempts per key cycle compared to prior art methods and systems.

Figure 2:
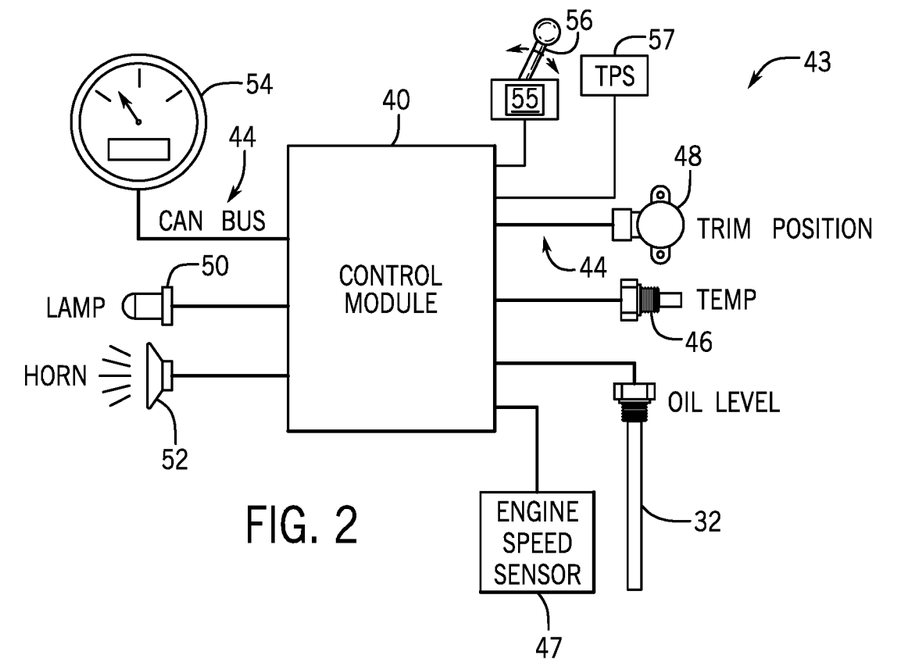
FIG. 2 depicts a system for determining an amount of oil in a marine drive.

FIG. 2 schematically depicts an exemplary system 43 for determining an amount of oil in a marine drive 10 during operation. The system 43 includes a control module 40, such as an engine control module (ECM), that communicates with and controls various peripheral devices via communication links 44. In the depicted embodiment, the ECM receives input from a trim position sensor 48, a temperature sensor 46, an oil level sensor 32, an engine speed sensor 47, and a position sensor 55 sensing a demand input based on the position of the throttle lever 56. In one example, the communication links 44 comprise a controller area network (CAN) bus, but other communication means may be used to facilitate communication between the various peripheral devices and the control module 40, including any wired or wireless communication means. It should be noted that the extent of connections of the communication links 44 represented in FIG. 2 are meant only to demonstrate that the various control elements are capable of communicating with one another, and do not represent actual wiring connections between the various elements, nor do they represent the only path of communication between the elements. For example, the communication links 44 may, in certain examples, be performed by any of various types of wireless communication systems implementing any available wireless communication protocol.

The systems and methods described herein may be implemented with one or more computer programs executed by one or more processors, which may all operate as part of a single control module 40. The computer programs include processor-executable instructions that are stored on a non-transitory tangible computer readable medium. The computer programs may also include stored data, such as one or more lookup tables. Non-limiting examples of the non-transitory tangible computer readable medium are nonvolatile memory, magnetic storage, and optical storage.

As used herein, the term module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Figure 3:
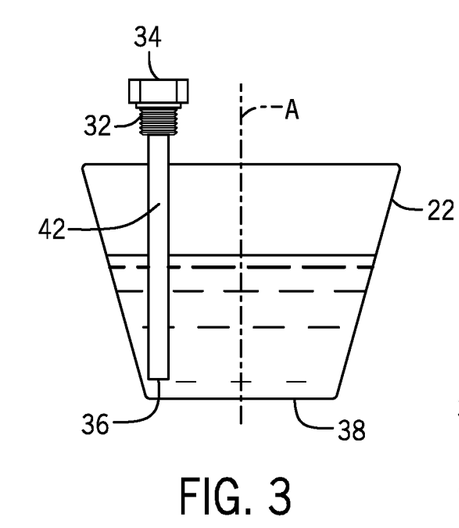
FIG. 3 depicts a sump collecting oil from an internal combustion engine when the marine drive is at a zero trim position.
Figure 4:
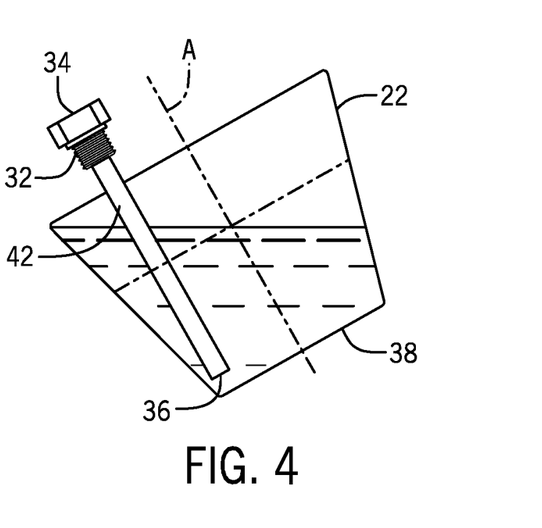
FIG. 4 depicts the sump when the marine drive is at a non-zero trim position.

In the example illustrated in FIGS. 2-4, the system 43 includes an oil level sensor 32 for sensing an oil level in the sump 22. In the depicted examples, the oil level sensor 32 is an electronic dipstick extending into the sump 22 for sensing oil level therein. The oil level sensor 32 has a first end 34, a second end 36, and an elongated shaft 42 extending there between. The second end 36 of the oil level sensor 32 is disposed in the sump 22 at a location proximate to the bottom 38 of the sump 22. The first end 34 of the oil level sensor 32 extends out of the sump 22. The oil level sensor 32 has an elongated shaft 42 extending between the first end 34 and second end 36. The elongated shaft 42 contains a reactive element for sensing level of oil. The type and configuration of oil level sensor 32 can vary from that shown. In one example, a resistance wire that extends at least from the maximum to minimum oil levels is heated by sending a constant current through it. A voltage drop across the wire depends on the amount of heat that is dissipated from the wire to the surrounding medium. Thus, the oil level in the sump 22 can be determined as oil conducts the heat better than air. The oil level sensor 32 communicates with an engine controller 40 (see FIG. 2). The voltage drop value is compared in the engine controller 40 to values in a look-up table listing voltage drop versus temperature. This type of oil level sensor is commercially available and manufactured by Siemens VDO. Other types of electronic oil level sensors may be used, such as a float switch sensor having a float that marks the surface of the oil in the sump. In still other examples, an optical sensor, an electromagnetic wave sensor, or a range imaging camera serving as a "time-of-flight" sensor could be utilized to measure the oil level in the sump 22.

The system 43 further includes a temperature sensor 46 for sensing and providing a temperature of the internal combustion engine 16 to the control module 40. In various examples, the temperature sensor 46 may be one of an oil temperature sensor measuring engine temperature as an oil temperature, or a coolant temperature sensor measuring engine temperature as an engine coolant temperature. Namely, the engine temperature must be within an operating temperature range so that thermal expansion due to oil temperature is accounted for in the oil level measurement by the sensor 32. Thereby, oil expansion can be consistently accounted for in the measurement by the system 43. To provide just one example, the temperature threshold may be an oil temperature measurement of 60 degrees Celsius.

The system 43 further includes an engine speed sensor 47 configured to sense a current engine speed of the internal combustion engine 16. In certain examples, the engine speed sensor 47 measures rotations per minute (RPM) of the engine 16. The type and location of the engine speed sensor 47 can vary, and in one example is a Hall Effect sensor or a variable reluctance sensor located near the encoder ring of the engine 16. Such an engine speed sensor 47 is known in the art and commercially available, for example, from CTS Corporation or Delphi. In the disclosed system and method, the engine speed output from the engine speed sensor 47 is monitored by the control module 40 in order to determine when the engine speed exceeds a speed threshold for at least a predetermined time period. The speed threshold and predetermined time period are calibratable values that are calibrated to indicate a minimum engine speed and time period required to reach a maximum amount of oil consumed in the internal combustion engine 16. Once such thresholds have been met, an equilibrium is reached regarding the amount of oil contained in the engine 16 and the amount of oil remaining in the sump 22 so that such values can be accounted for in the interpreted sensed values from the oil level sensor 32 in the sump 22.

Another sensor signal provided to the control module 40 represents the physical position of a throttle lever 56. The throttle lever 56, as an exemplary user input device, is manually moveable by a user to control torque and acceleration of a marine vessel. The position of the throttle lever 56 is sensed by position sensor 55, which provides a signal to the control module 40 representing the position of the throttle lever 56. Thus, the change position of the throttle lever 56 represents a demand for a change in vessel speed, i.e. commanding an acceleration or deceleration of the engine speed. In certain embodiments, the system 43 may instead determine user demand via a throttle position sensor (TPS) 57 sensing the angular position of the throttle valve or plate. For example, in embodiments having a mechanical connection between the throttle lever 56 and the throttle valve, the increase or decrease in demanded engine speed may be determined based on TPS 57 output.

The output of at least one of the engine speed sensor 47, the position sensor 55, or the TPS 57 is monitored to determine when a threshold drop in engine speed to an idle threshold occurs. The inventors have recognized that a consistent and reliable oil level measurement can be obtained after a specified delay following an immediate drop in engine speed from at or above the RPM threshold to an idle setpoint for the marine drive 10. In various embodiments, the threshold drop in engine speed may be detected based on output of the engine speed sensor 47, or may be closely approximated based on detection of a threshold change in throttle position measured by at least one of the position sensor 55 or the TPS 57. The predetermined delay period is a preset time period that avoids erroneous measurements due to movement of oil in the sump 22, which allows any splashed oil to drain off of the oil level sensor 32 and allows for reduction of potential movement of the oil in the sump 22 due to the sudden decrease in engine RPM. The predetermined delay period is optimized to be long enough to allow settlement of the oil located in the sump 22, while also being short enough to avoid substantial oil draining from engine 16 back into the sump 22. Thereby, the oil level is sampled at a consistent point on the oil consumption curve, where a fixed amount of oil is located in the engine 16 versus the sump 22. The predetermined delay period may be a fixed value, or may be calibratable value at the time of engine set up.

At the end of the predetermined delay period, one or more samples are taken of the output from the oil level sensor 32, and an oil amount in the marine drive 10 is determined therefrom. In certain examples, compensation values are added to the sampled oil level in the sump in order to determine the total oil amount. For example, a calibrated compensation amount is added to the oil level measured from the sump to represent the amount of oil in the internal combustion engine when the sump measurement is taken. For example, the calibrated compensation amount may represent the volume of oil contained in the engine when the above-referenced equilibrium of operation is achieved, where a consistent amount of oil is contained in the internal combustion engine 16. The amount of oil suspended in any particular engine while running at speed is a consistent and determinable amount, and is generally a known value for any particular engine. To provide just one explanatory example, a particular V8 marine engine model may hold two quarts of oil once it reaches the equilibrium point, and an exemplary compensation amount for that engine could then be two quarts. In other embodiments, the compensation amount may be slightly less than the aforementioned equilibrium value, representing an initial amount of oil that consistently drains back into the sump 22 during the predetermined delay period.

Figure 5:
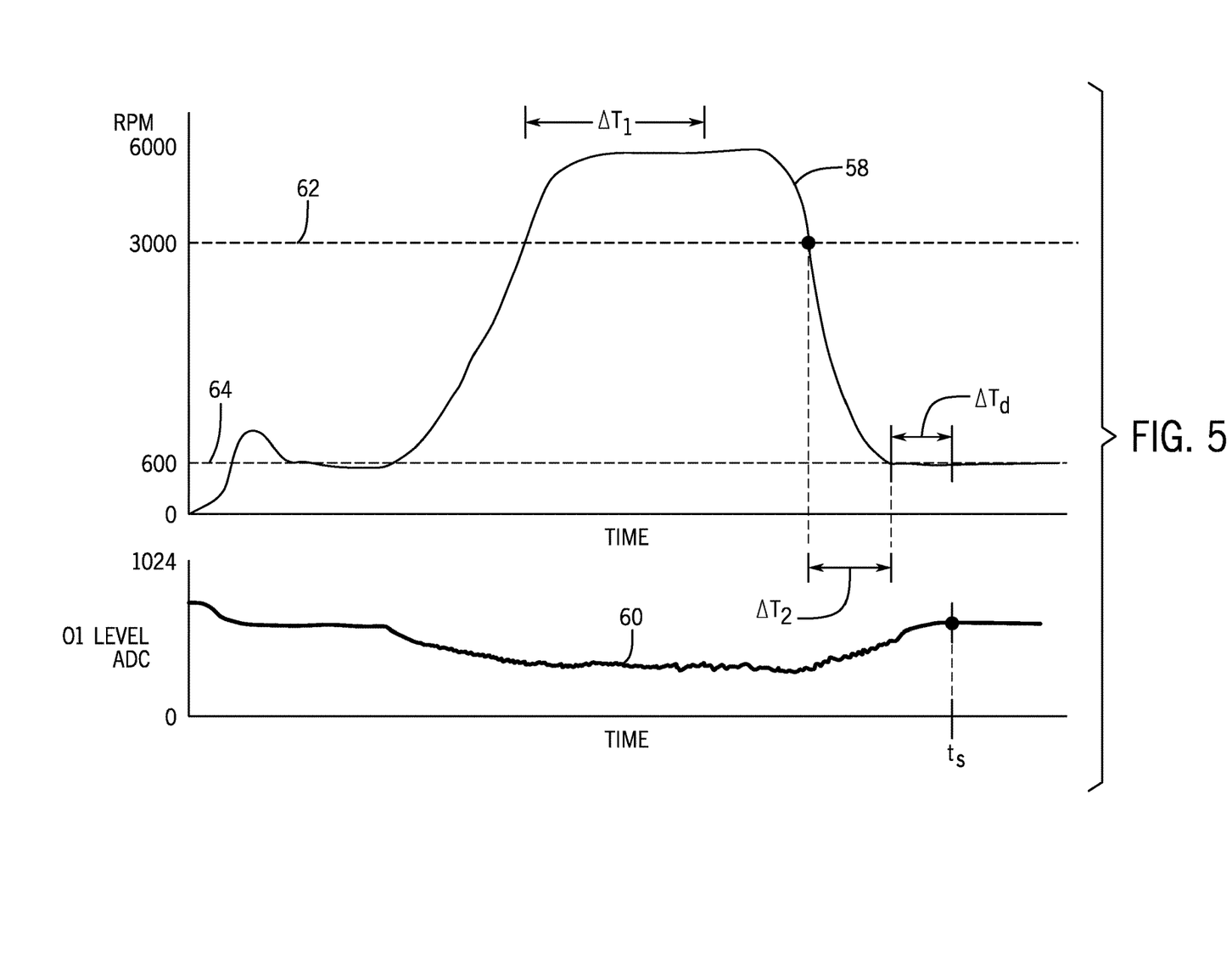
FIG. 5 is a graph depicting engine speed and oil level, and exemplifying one embodiment of a method of determining an oil amount.
Figure 6:
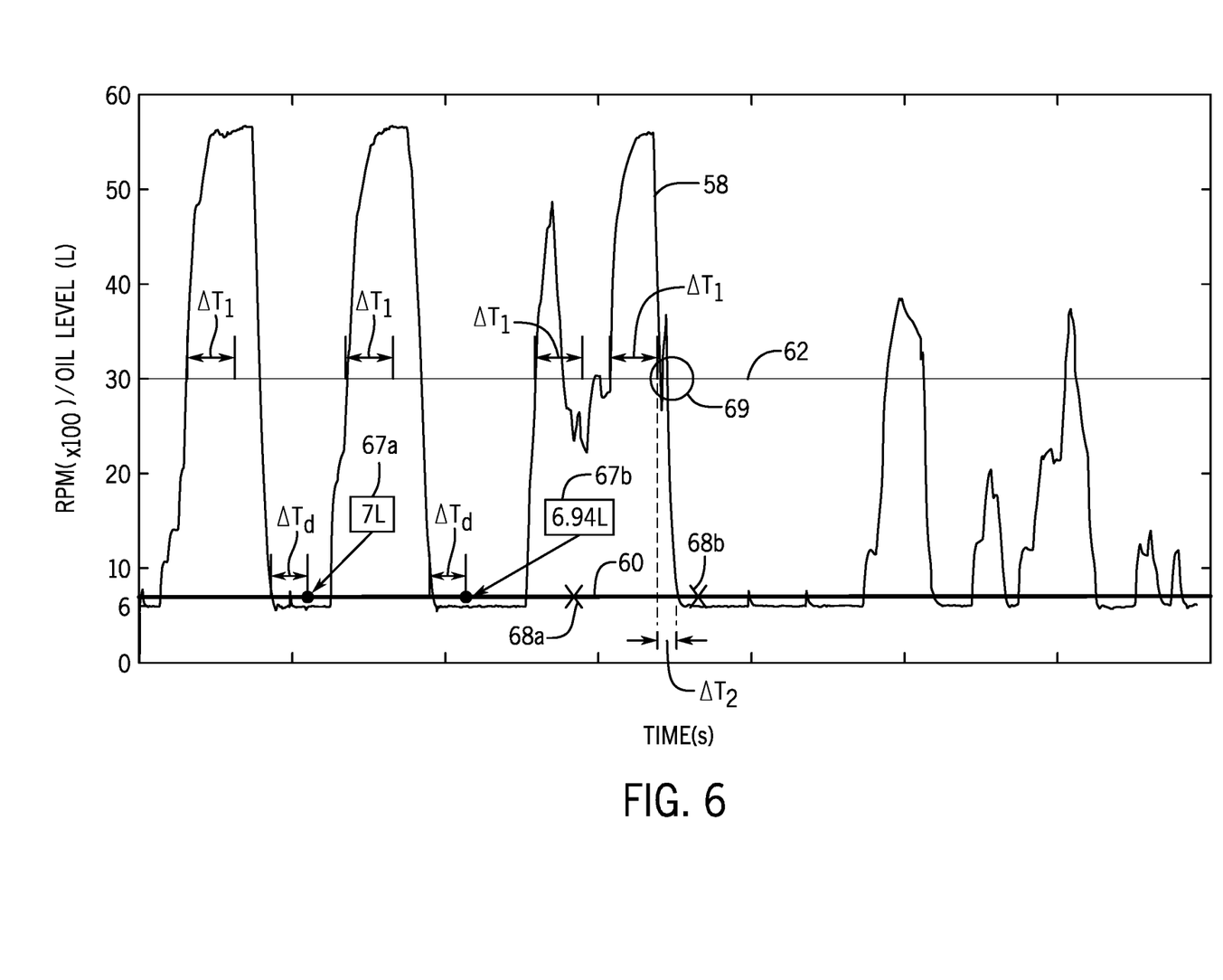
FIG. 6 is another graph depicting engine speed and oil level over time, and providing another explanatory example of the method of determining an oil amount in a marine drive.

The measurement preconditions are exemplified in FIGS. 5 and 6. In FIG. 5, the top portion of the graph provides line 58 representing engine RPM, and the bottom portion of the graph providing line 60 represents oil level sensor value at corresponding times to the RPM line 58. The graph assumes that the temperature threshold is met. In the example, the engine RPM increases above the engine speed threshold 62, which in the depicted example is 3,000 RPM. The engine RPM remains above the speed threshold 62 for greater than the first predetermined time period $\Delta T_1$. The control module 40 then detects the threshold drop engine speed to an idle threshold. In the depicted example, the threshold drop in engine speed is detected when the engine speed decreases from the engine speed threshold 62 to the idle setpoint 64 within a predetermined time period, represented as $\Delta T_2$. The predetermined delay time is represented as $\Delta T_d$, which begins when the engine RPM reaches the idle setpoint 600. For example, the control module 40 may monitor the engine RPM during the predetermined delay period $\Delta T_d$ to ensure that the engine RPM remains within a predetermined range of the idle setpoint, or another idle threshold, during the predetermined delay and while the oil level in the sump is sampled by the oil level sensor 32.

In certain embodiments, the idle threshold may be the idle setpoint, or may be value slightly greater than the idle setpoint. In the depicted embodiment, the idle setpoint 64 is 600 RPM. As will be known to a person having ordinary skill in the art, idle setpoints will vary for different marine drives 10. Assuming that the engine speed remains within the predetermined range of the idle threshold during the predetermined delay $\Delta T_d$, then the oil level is sampled at time $t_s$, which is immediately upon conclusion of the predetermined delay. Thereby, the oil level in the sump is sampled in accordance with the consistency conditions described above. In certain embodiments, a predetermined number of samples may be taken of the oil level, such as at a predetermined number of sample intervals, or periods, of the electronic oil level sensor 32. The multiple samples may then be averaged to provide the sampled oil level in the sump, thereby alleviating error due to momentary noise appearing in just one or a small number of sensor readings from the oil level sensor 32.

A person having ordinary skill in the art will understand in light of this disclosure that the same analysis exemplified at FIG. 5 with regard to engine speed may be performed based on throttle position. Namely, the detection of the threshold drop in engine speed may be replaced with detection of a threshold change in throttle position measured by at least one of the position sensor 55 or the TPS 57. Likewise, a the speed threshold 62 may instead be a throttle position threshold, and a condition determined based on whether the output of the position sensor 55 or the TPS 57 is at or above that throttle position threshold for at least the first predetermined time period $\Delta T_1$. To provide just one example, the threshold throttle position may be at or around 50% of the available position range if the throttle lever 56 or the throttle valve. Then, if a threshold decrease in throttle position (either at the throttle lever 56 or at the throttle valve) is detected within a second predetermined time period $\Delta T_2$, then oil level is sampled after the predetermined delay $\Delta T_d$, as is described above and shown in FIGS. 5 and 6. The threshold decrease in throttle position is a change in the output of the position sensor 55 or the TPS 57 from the respective throttle position threshold to an idle threshold position, such as the position of the throttle valve commanded by and idle controller or a position of the throttle lever 56 associated with an idle command. Thus, throttle position output according to the position sensor 55 or the TPS 57 can serve as a proxy for direct assessment of engine speed, providing sufficient approximation of engine speed to provide relatively reliable oil amount calculations. However, if highly precise oil amount determinations are required (such as within +/−100 mL or less), then control based on engine speed may be preferred.

FIG. 6 provides and exemplary trace recorded from a marine drive 10, where line 58 represents the recorded engine speed and line 60 represents the sensed oil levels in the sump over time. The engine temperature at the time of obtaining the depicted trace was greater than the temperature threshold for the specific marine drive 10, and thus the temperature threshold was met. Following in chronological order, the engine RPM, represented at line 58, increases above the speed threshold 62 of the 3,000 RPM for greater than the first predetermined time period $\Delta T_1$, and thus the speed threshold condition is met. The first predetermined time period $\Delta T_1$ is a calibratable value and represents a sufficient length of time for the amount of oil consumed in the engine to reach equilibrium, and thus a consistent value. To provide just one example, the first predetermined time period $\Delta T_1$ may be in the range of one to two minutes, but could be longer or shorter depending on the size and configuration of the engine 16. The engine speed then abruptly drops to the idle threshold, satisfying the threshold drop condition. For clarity, the second time period of $\Delta T_2$ is not depicted where the condition is satisfied. The engine speed then remains within the predetermined range of the idle threshold of 600 RPM for the predetermined delay period $\Delta T_d$. To provide just one example, the predetermined delay period $\Delta T_d$ may be in the range of 150-300 milliseconds, but could be longer or shorter depending on the size and configuration of the engine 16. Thus, all preconditions are satisfied and so the oil level measured by the oil level sensor 32 in the sump 22 is sampled at point 67a, which in the example is 7.0 liters. The same preconditions are again satisfied to yield a second oil level sample at point 67b of 6.94 liters.

In the third interval, the conditions leading up to point 68a are not such that the preconditions are satisfied for determining an oil amount according to the method described herein. Namely, the engine speed is not maintained at or above the speed threshold 62 for the first predetermined time period $\Delta T_1$. Thus, at point 68a, the oil level in the sump is not sampled. In the next interval, the preconditions for determining the oil amount are again not met. In that scenario, the speed threshold condition is satisfied because the engine speed exceeds the speed threshold 62 for the first predetermined time period $\Delta T_1$. However, the threshold drop condition is not met. Namely, after decreasing below the speed threshold 62, the engine speed revs upward momentarily (highlighted by circle 69) before dropping to the idle threshold. Thus, the engine speed does not decrease from the speed threshold 62 to the idle threshold within the second predetermined time period $\Delta T_2$. To provide just one explanatory example, the second predetermined time period $\Delta T_2$ may be in the range of 0.5-1 second, but could be longer or shorter depending on the size and configuration of the engine 16. Accordingly, the oil level is not sampled at point 68b and no oil amount determination is made.

Additionally, if any of the sensors used for oil level are in a faulted state, such as shorted high or shorted low, an oil level will not be determined. For example if the engine temperature sensor is shorted high, the oil level will not be sampled because it cannot be known if the consistency criteria have been met.

Once the oil level in the sump 22 is measured, the compensation amount is added to account for the oil contained in the engine 16 at the time of measurement. In certain embodiments, an additional compensation amount, which may be a positive or negative amount, may be added to account for trim position of the marine drive 10. For example, the system 43 may include a trim position sensor 48 for sensing and providing trim position of the marine drive 10 to the control module 40. FIGS. 3 and 4 depict the sump 22 at different trim positions of the marine drive 10. FIG. 3 shows the sump 22 when the outboard motor is at a zero trim position, i.e. when the outboard motor marine drive 10 has the trim position shown in FIG. 1 and the internal combustion engine 16 is perpendicular to the waterline 28. FIG. 4 shows the sump 22 when the outboard motor is trimmed upwardly to a non-zero trim position. Also depicted is an electronic oil level sensor 32 extending into the sump 22 for sensing oil level in the sump 22.

Comparing FIG. 3 and FIG. 4, it can be seen that the oil level that is sensed by the oil level sensor 32 will vary based upon the particular trim position of the outboard motor marine drive 10. That is, for a given amount of oil in the sump 22, the oil level that is sensed by the oil level sensor 32 will vary depending upon the particular trim position of the marine drive 10. In this example, the oil level sensor 32 is shifted leftward of the center axis A of the sump 22. As such, the oil level that is sensed by the oil level sensor 32 in FIG. 3 is less than the oil level that is sensed in the example of FIG. 4. This is a direct result of the difference in trim of the marine drive 10. If the oil level sensor 32 were shifted rightward of the axis A, the opposite effect would occur. The oil level sensor 32 would detect an oil level that is greater in the example of FIG. 3 compared to the example of FIG. 4.

Accordingly, the control module 40 may be configured to calculate a trim compensation amount based on the measured trim position by the trim position sensor 48 in order to compensate for the position of the distribution of the oil in the sump 22 at the given trim position. For example, compensation values based on trim position may be provided in a look up table stored in memory having calibrated compensation values based on trim position. Such a system and method for providing a trim compensation amount is exemplified and described in more detail at U.S. Pat. No. 8,657,638, which is incorporated by reference above.

In certain embodiments, the control module 40 may further be configured to, prior to executing the above-described steps for calculating the oil amount, determine whether the trim position measured by the trim position sensor 48 is within an acceptable trim range, which is a calibratable range of trim positions at which the impact of steering angle on the sensed oil level in the sump is not significant. Namely, in addition to trim position, the steering angle of an outboard motor marine drive 10 can impact the distribution of the oil in the sump 22. At certain trim angles, this impact is significant and can affect the reliability of the oil level sample. At the neutral trim position, as exemplified in FIG. 3, the steering angle has minimal to no impact on the oil distribution in the sump 22. However, as the trim position gets further away from that neutral position, such as at the extreme trimmed in position or extreme trimmed out position, the steering angle has a greater impact on the distribution of the oil in the sump 22. Thus, at trim angles outside of a calibrated trim angle range, the oil level sensed in the sump 22 may be too unreliable, and thus trim angle constraints may be provided outside of which the method is not executed.

Referring again to FIG. 2, the system 43 may further include visual and/or audio indicator devices that indicate an amount of oil in the marine drive 10 and/or provide an oil level alert to an operator when insufficient oil is detected. In various examples, the indicator devices may include a lamp 50 that illuminates to provide a low oil indicator to a user, a horn 52 or speaker that provides and auditory low oil to an operator, and/or a display dial 54. As is common, the display dial 54 can indicate an oil amount in the marine drive 10, and may also provide a warning indicator when the oil amount is below a predetermined value. The depicted indicator devices are for exemplary purposes and are not limiting. Other known indicator devices are available, such as digital displays and/or the like.

The control module 40 may be configured to detect a fault condition when the determined oil amount is below a low oil value. Namely, the determined oil amount may be compared to a calibrated low oil value stored in memory, and a fault condition detected based on the comparison, such as when the determined oil amount is less than the stored low oil value. In certain examples, the control module 40 may require that the oil amount meets a predetermined consistency condition prior to detecting a fault condition. The predetermined consistency condition is devised to avoid over detection of a fault, such as due to erroneous oil amount determinations. To provide one example, the predetermined consistency condition may require a threshold number of determined oil amounts to be less than the stored low oil value—e.g., such as an x out of y condition requiring that a threshold percentage of the determined oil amounts out of a determined set size be below the stored low oil value. Alternatively or additionally, the predetermined consistency condition may require that the determined oil amounts be within a predetermined error range of the previous and subsequent determined oil amounts, thus avoiding detecting fault condition based on erroneously low determined oil amount. Once a fault condition is detected, one or more of the indicator device 50, 52, 54 may be operated to inform the operator of the fault condition.

Figure 7A:
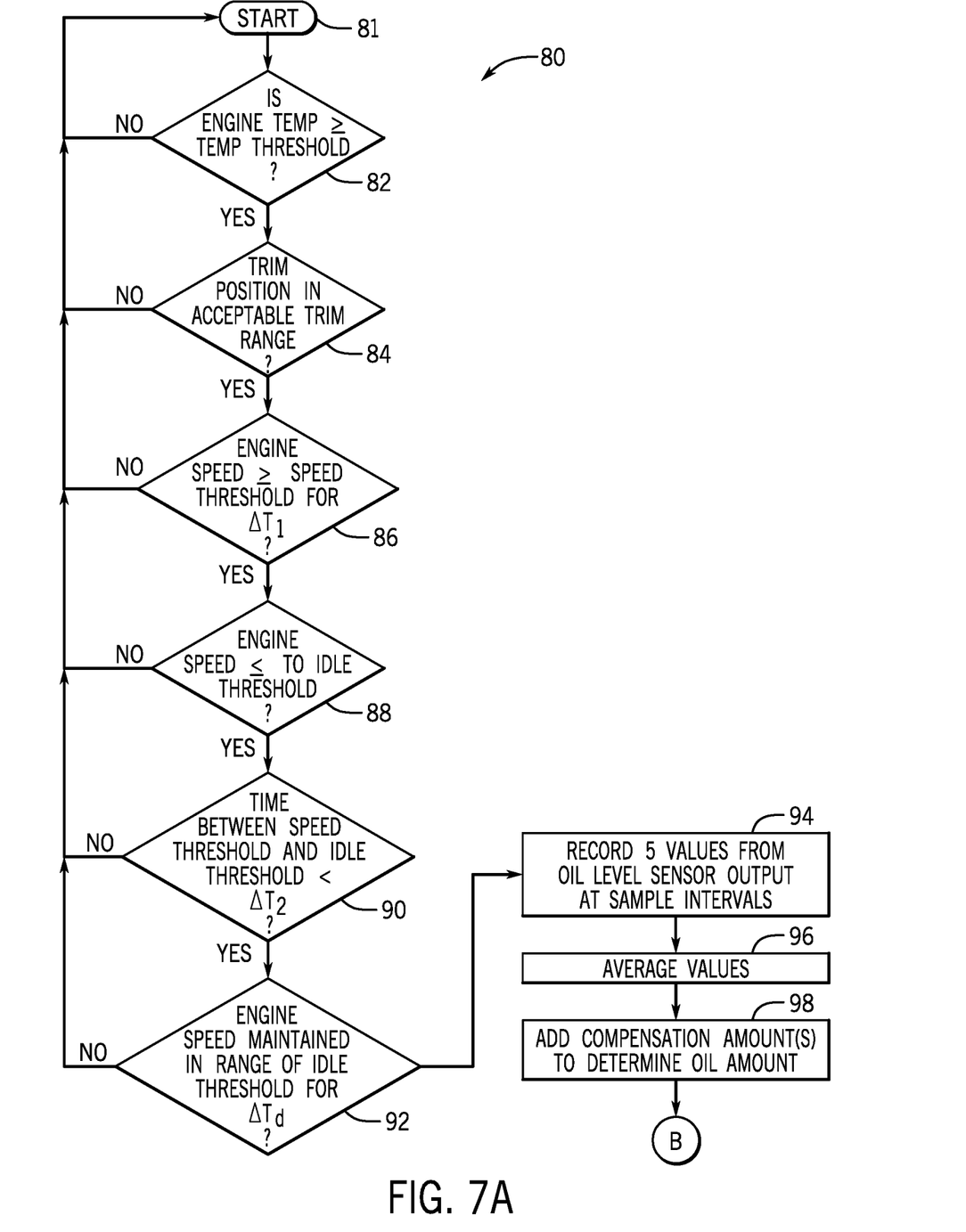
FIGS. 7A and 7B are flow charts depicting another example of a method of determining an oil amount utilizing an oil level sensor.
Figure 7B:
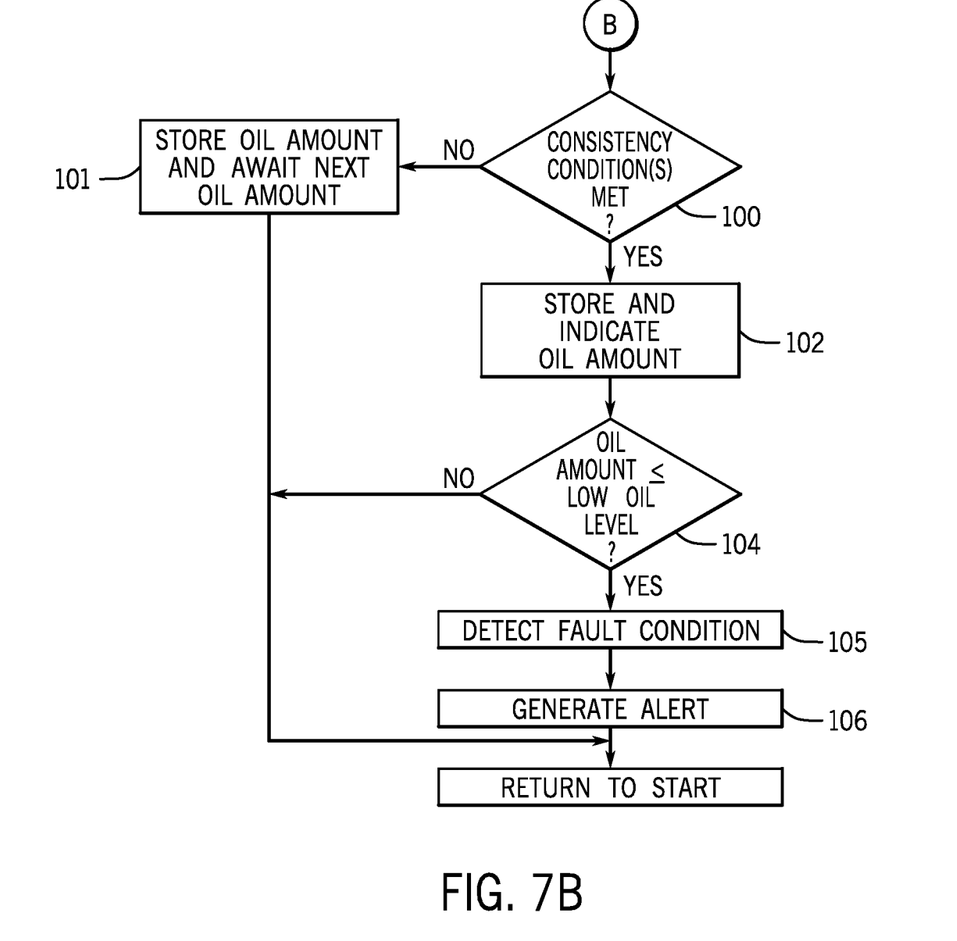

FIGS. 7A and 7B depict an exemplary method 80 of determining an oil amount in a marine drive. The control module 40 initiates the oil amount determination logic at step 81, such as upon key up. Instructions are executed at step 82 to receive the engine temperature from the temperature sensor 46 and determine whether the engine temperature has reached the temperature threshold. Once the temperature threshold is reached, then a determination may be made at step 84 to assess whether the trim position (such as measured by the trim position sensor 48) is within an acceptable trim range. If not, then the algorithm returns to the start at step 81. As long at the trim position is within the acceptable trim range, then the control module 40 progresses to step 86, where engine speed is monitored to determine when the engine speed has exceeded the speed threshold for at least the first predetermined time period $\Delta T_1$. Once that condition is met, then the control module 40 further assesses engine speed to determine, at step 88, when the idle threshold is reached. Step 90 is then executed to determine whether the threshold engine drop in engine speed condition is met. In the depicted example, the threshold drop in engine speed condition is met when the difference between the time that the engine speed crosses the speed threshold and the time that the engine speed reaches the idle threshold is less than the second predetermined time period $\Delta T_2$. If so, then a last condition is checked at step 92 to verify that the engine speed is maintained within a predetermined range of the idle threshold for a predetermined delay period $\Delta T_d$.

Once all of those conditions are met, the oil level in the sump is sampled at step 94. In this example, five values are recorded from the oil level sensor 32 at predetermined sample intervals. The number of sample intervals is a calibratable value that could be larger or smaller than five samples. The oil level samples are close together in time to avoid introduction of error due to oil draining back into the sump 22 from the engine 16. To provide just one example, the sample interval may be 100 ms, but in other embodiments could be shorter or longer depending on the sensor configuration and the capabilities of the control module. The sampled values recorded at step 94 are averaged at step 96 in order to determine a sensed oil level value. The oil amount determination is then completed at step 98 by adding one or more compensation amounts. For example, a compensation amount may be added representing the amount of oil in the internal combustion engine when the oil level in the sump is sensed. Alternatively or additionally, a trim compensation amount may be added to compensate for a non-neutral trim position measured by the trim position sensor 48.

FIG. 7B represents exemplary steps that may be executed to assess whether the oil amount meets a predetermined consistency condition and/or indicates that the amount of oil in the marine drive 10 is low. Instructions are executed at step 100 to determine whether one or more predetermined consistency conditions are met, examples of which are described above. If one or more of the consistency conditions are not met, then the determined oil amount is stored at step 101 and the control module 40 returns to start to await the next oil amount. Thus, no action is taken based on oil amount determinations that do not meet the consistency condition. Once the consistency conditions are met, then the oil amount is indicated at step 102, such as via the display dial 54 or another indicator device that indicates oil level. The determined oil amount is compared to a stored low oil level value at step 104. If the oil amount is above the low oil level, then the control module 40 returns to step 81 and restarts the oil assessment algorithm. If the oil amount is at or below the low oil level, a fault condition is detected at step 105. Then an alert is generated at step 106, such as via the lamp 50, horn 52, and/or any other display device that can be utilized to inform the operator of the detected fault condition. The control module 40 then returns to step 81 and continues to monitor the oil amount.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of determining oil amount in a marine drive, the marine drive comprising an internal combustion engine that drains oil to a sump, the method comprising:

determining that an engine temperature exceeds a temperature threshold;

determining that an engine speed of the internal combustion engine exceeds a speed threshold or that a throttle position exceeds a throttle position threshold for at least a first predetermined time period;

detecting a threshold drop in engine speed to an idle threshold or a threshold change in throttle position to an idle position;

sampling an oil level in the sump with an oil level sensor while the engine speed remains within a predetermined range of the idle threshold or the throttle position remains within a predetermined range of the idle position; and determining an oil amount in the marine drive based on the sampled oil level in the sump.

2. The method of claim 1, further comprising, immediately following detection of the threshold drop in engine speed to the idle threshold or the threshold change in throttle position to the idle position, determining that the engine speed remains within the predetermined range of the idle threshold or the throttle position remains within the predetermined range of the idle position for a predetermined delay period prior to sampling the oil level in the sump.

3. The method of claim 2, further comprising, immediately upon conclusion of the predetermined delay period, sampling the oil level in the sump for a predetermined number of sample intervals; and wherein determining the oil amount includes calculating an average of the predetermined number of sampled oil levels.

4. The method of claim 3, wherein determining the oil amount further includes adding a compensation amount to the average, wherein the compensation amount is a calibrated value representing an amount of oil in the internal combustion engine when the oil level in the sump is sensed.

5. The method of claim 1, wherein detecting the threshold drop in engine speed includes determining that the engine speed decreases from the speed threshold to the idle threshold within a second predetermined time period.

6. The method of claim 1, further comprising comparing the oil amount in the marine drive with a low oil value;

detecting a fault condition based on the comparison; and operating an indicator device to inform an operator of the fault condition.

7. The method of claim 6, further comprising determining that the oil amount in the marine drive meets a predetermined consistency condition with respect to the low oil value prior to detecting the fault condition.

8. The method of claim 7, wherein the predetermined consistency condition includes a threshold number of determined oil amounts being less than the low oil value.

9. The method of claim 1, wherein engine temperature is one of an oil temperature measured by an oil temperature sensor and an engine coolant temperature measured by a coolant temperature sensor.

10. The method of claim 1, wherein the temperature threshold is a low end of an operating temperature range for the marine drive.

11. The method of claim 1, further comprising, prior to sampling the oil level in the sump, determining whether a trim position for the marine drive is within an acceptable trim range, wherein the acceptable trim range is a calibratable range of trim positions at which an impact of steering angle on the sensed oil level in the sump is not significant; and if the trim position is within the acceptable trim range, determining the oil amount in the marine drive based further on the trim position; and if the trim position is not within the acceptable trim range, stopping the oil amount determination.

12. A system for determining oil amount in a marine drive, the marine drive including an internal combustion engine having a lubrication system that includes a sump, the system comprising:

an oil level sensor that senses an oil level in the sump;
a temperature sensor that senses an engine temperature;
a control module configured to:
determine that the engine temperature exceeds a temperature threshold;
determine that an engine speed of the internal combustion engine exceeds a speed threshold or that a throttle position exceeds a throttle position threshold for at least a first predetermined time period;
detect a threshold drop in engine speed to an idle threshold or a threshold change in throttle position to an idle position;
sample an oil level in the sump sensed by the oil level sensor; and
determine an oil amount in the marine drive based on the sampled oil level in the sump.

13. The system of claim 12, wherein the control module is further configured to determine that the engine speed remains within a predetermined range of the idle threshold for a predetermined delay period prior to sampling the oil level in the sump.

14. The system of claim 13, wherein the control module is further configured to, immediately upon conclusion of the predetermined delay period, sample the oil level in the sump for a predetermined number of sample intervals; and
wherein the oil amount determination includes calculating an average of the predetermined number of sampled oil levels.

15. The system of claim 14, wherein the control module is further configured to determine the oil amount further by adding a compensation amount to the average, wherein the compensation amount is a calibrated value representing an amount of oil in the internal combustion engine when the oil level in the sump is sensed.

16. The system of claim 12, wherein detection of the threshold drop in engine speed includes determining that the engine speed decreases from the speed threshold to the idle threshold within a second predetermined time period.

17. The system of claim 12, wherein the control module is further configured to:
determine that the oil amount in the marine drive meets a predetermined consistency condition;
compare the oil amount in the marine drive with a low oil value;
detect a fault condition based on the comparison; and
operate an indicator device to inform an operator of the fault condition.

18. The system of claim 12, wherein the temperature sensor is one of an oil temperature measuring engine temperature as an oil temperature sensor and a coolant temperature sensor measuring engine temperature as an engine coolant temperature.

19. The system of claim 12, wherein the temperature threshold is a low end of an operating temperature range for the marine drive.

20. The system of claim 12, wherein the control module is further configured to, prior to sampling an oil level in the sump, determine whether a trim position for the marine drive is within an acceptable trim range, wherein the acceptable trim range is a calibratable range of trim positions at which an impact of steering angle on the sampled oil level in the sump is not significant; and
if the trim position is within the acceptable trim range, determine the oil amount in the marine drive based further on the trim position; and
if the trim position is not within the acceptable trim range, stop the oil amount determination.

* * * * *